Feb. 28, 1967    O. F. WHITE    3,306,532
APPARATUS FOR REPELLING INSECTS
Filed July 27, 1965    2 Sheets-Sheet 2
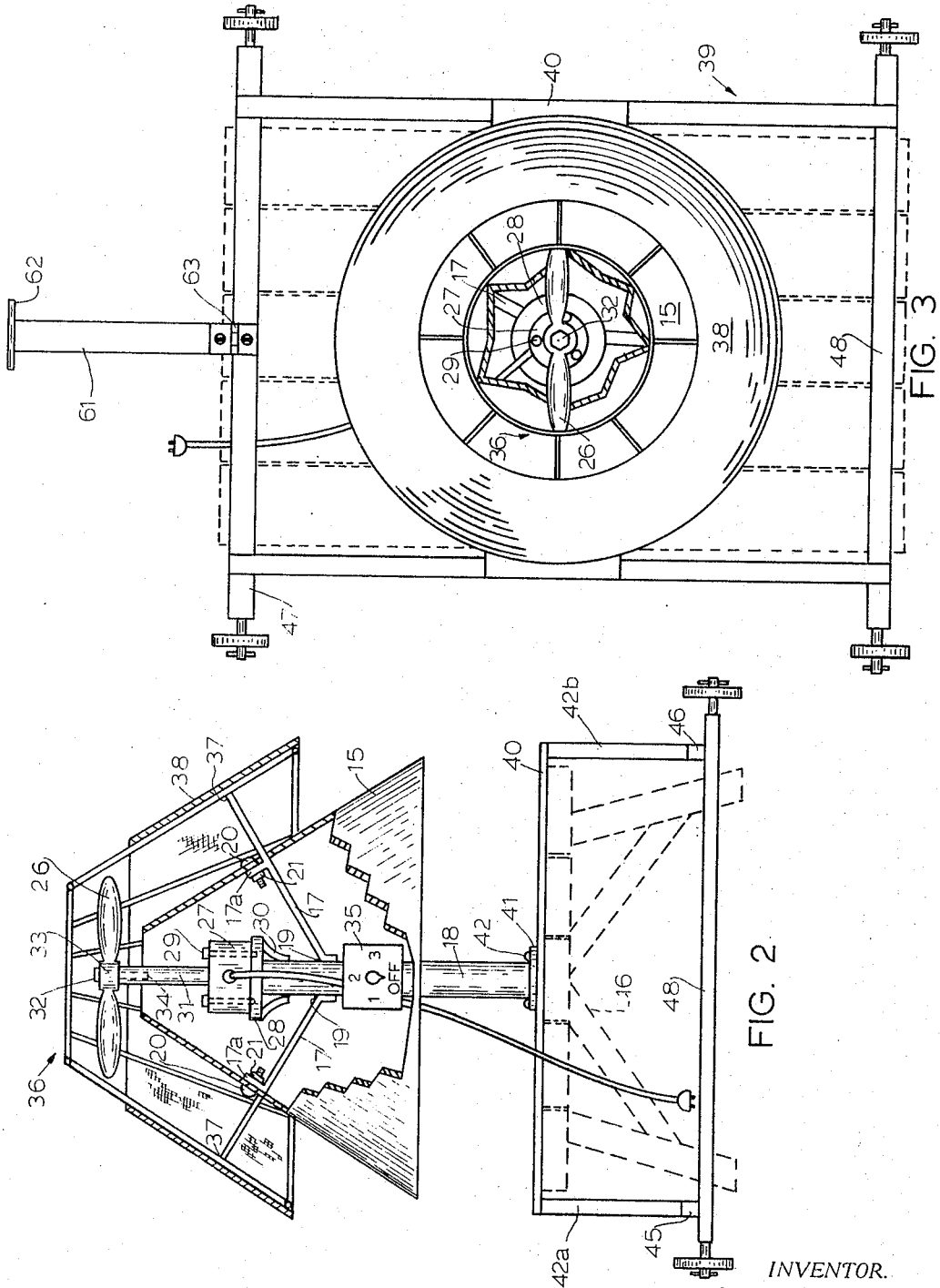
INVENTOR.
Odas F. White
BY
B. B. Olive
ATTORNEY

United States Patent Office 3,306,532
Patented Feb. 28, 1967

3,306,532
APPARATUS FOR REPELLING INSECTS
Odas F. White, Box 833, Hillsborough, N.C. 27278
Filed July 27, 1965, Ser. No. 475,046
6 Claims. (Cl. 230—241)

This application is a continuation-in-part of a now pending application filed July 28, 1964, and having the Serial No. 385,645, now Patent Number 3,258,200.

This invention relates to insect repellers and more particularly to an insect repeller having means to establish a boundary layer of air around a given area, such as a picnic area, a work bench, etc., which is impervious to insects.

The present invention is concerned with an insect repeller of the type which is mounted on a wheeled support structure and which includes a structure that serves to shade an area and to direct a flow of air around the area. It is known that a stream of air of sufficient velocity will not be penetrated by insects, such as flies, gnats, mosquitoes, and the like. Conventional electric fans have been employed, for example, in dairies where large numbers of flying insects are encountered. Insects and more particularly flying insects are bothersome around picnic areas. Swatters, fly-paper and the like have helped control insects but such means of control are unsanitary and bothersome to use. Aside from the insect problem, it is desirable when employing electric fans at picnics or around the area of a work bench to be protected from a direct blast of air, to have means for shading food and drink and to have a cool area in which to sit or work.

With the foregoing in mind, an object of this invention is to provide an improved forced air apparatus for repelling insects and the like around a particular area.

Another objects is to provide a mobile forced air apparatus with a channel for directing a stream of forced air downwardly to protect a given area from insects.

Another object is to provide a mobile forced air apparatus capable of being positioned over a table for shading, cooling, and repelling insects.

Other objects will become more evident upon reading the following description when taken in reference to the drawings, in which:

FIGURE 2 is a side elevation view partly in section of the mobile insect repelling apparatus positioned in a working relation with a picnic table; and FIGURE 3 is a plan view of the mobile insect repeller of FIGURE 2.

Figure 1:
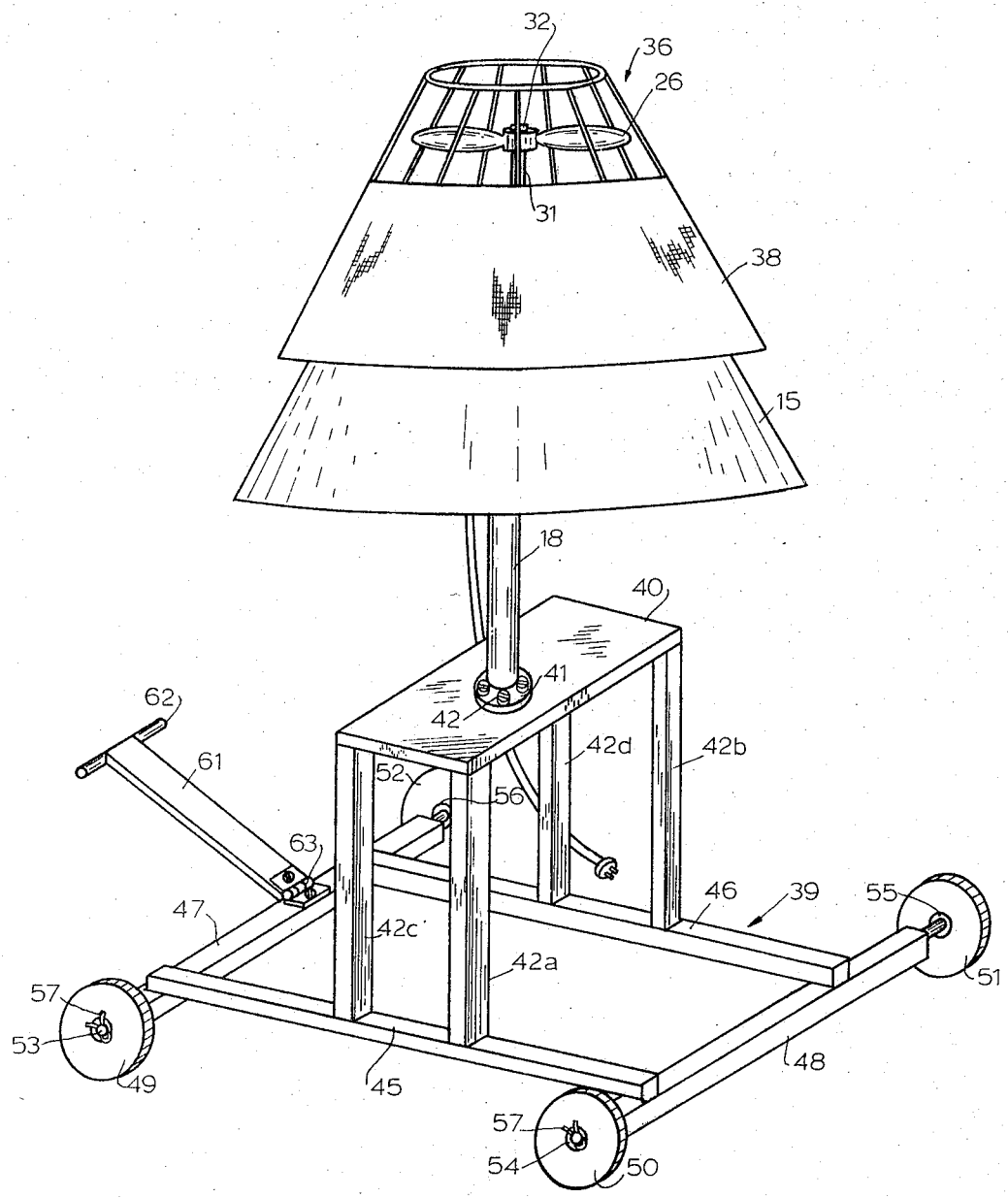
FIGURE 1 is a perspective view of the insect repeller apparatus arranged as a mobile unit.

The invention provides a vertically extending shaft having mounted thereon a lower, thin wall, cone shaped member, an upper cone shaped member being axially aligned therewith and a driven propeller. The propeller is rotated at a relatively high speed in a horizontal plane and is in axial alignment with the cones. The base of the cone includes an area which is large enough to shade a conventional picnic table or work bench. As the propeller turns, air is forced downwardly toward the table between the outer surface of the lower cone and the inner surface of the upper cone. The upper cone may be made from a thin walled rigid material or from a fabric which covers a conical and rigid frame. The propeller thus effectively establishes a conical wall of disturbed air or a buffered air zone around the area beneath the cone which may be varied by controlling the revolving speed of the propeller to combat the prevailing air velocity and insects. Air of a sufficient velocity will effectively form a boundary layer which is impervious to insects. In addition to serving as a means for deflecting the air as described, the lower cone also serves the useful and practical purpose of shading such food and drink as may reside under its umbrella and protecting them from any direct blast of air. Once the apparatus is positioned over a picnic or work table, a cool, insect free area is established beneath the cone thereby offering comfort to the users.

Describing the preferred embodiment of my invention as illustrated in the accompanying figures, the previously mentioned cone member comprises a thin wall, relatively rigid conical shaped member 15 hereafter referred to as cone 15. Cone 15 is supported in an upright and stable position above a table 16 by means of suitable brackets 17 which are secured to a rigid post 18. Brackets 17 are secured at one end to post 18 by means of a welds 19 and by means of flanges 17a, which are mounted along the length of brackets 17, to cone 15 and by bolts 20 and nuts 21. Brackets 17 extend through the cone 15 and are fastened at their extreme ends to an upper conical shaped skeleton frame 36. Skeleton frame 36 is rigidly secured on brackets 17 by welds 37. A fabric covering 38, which covers approximately two-thirds of the frame 36, is placed upon frame 36 and acts to channel the forced air downwardly and outwardly. Covering 38 may be secured to frame 36 by any suitable means such as stitching, lacing, brackets, etc. The upper portion of frame 36 is uncovered and serves as a guard for propeller 26. Conical shaped skeleton frame 36 may also be a composite cone which may be made from any relatively rigid material such as plastic, sheet metal, aluminum sheeting and the like.

The post 18, upon which the insect apparatus is mounted, is secured to a mobile cart 39 by being welded to a plate 41 which is in turn secured to top wall 40 of cart 39 by screws 42. Top wall 40 has upright end support by 42a, 42b, 42c and 42d which in turn are welded to a pair of horizontal frame members 45, 46. Top wall 40 and end supports 42a, 42b, 42c and 42d essentially form an inverted U-shaped plate. Frame members 45, 46 are welded upon axles 47, 48 which have bearings 53, 54, 55 and 56 upon which are respectively mounted wheels 49, 50, 51 and 52. Cotter pins 57 retain the wheels on their respective bearings. A pulling arm 61 and handle 62 are attached to axle 47 by hinge 63 for moving the cart 39. Cart 39 is designed to be positioned around table 16 with upright members 42a, 42b, 42c and 42d and top wall 40 is designed to straddle table 16. Cart 39 enables the insect repelling apparatus to be moved over the table and removed as desired. Top wall 40 may be stamped from sheet metal and the remainder of the structure may be made of round metal stock. It is to be noted that plate 41 may be disassociated from top wall 40 and may be mounted on any conventional table.

The description now moves to the air moving apparatus of the invention. A cylindrical wall of downwardly moving disturbed air is established around the area beneath cone 15 by means of a propeller 26 which is driven by a motor 27. Motor 27 is mounted on a motor mount plate 28 by means of bolts 29 which extend through the motor housing and into the motor mount plate 28. The motor mount plate 28 is held in position by brackets 30 which are welded at one end to the motor mount plate 28 and at the other end to the rigid post 18. The motor 27 causes shaft 31 to rotate thereby rotating propeller 26 which is secured in position on shaft 31 by means of bolt 32 which extends through the hub 33 of the propeller 26 and is screwed into a tapped hole 34 in shaft 31.

The propeller 26 turns rapidly and depending on its size at a relatively high velocity. In order to adjust to various wind conditions and insect conditions, motor 27 is selected to have a speed characteristic within the range of speeds desired responsive to the applied voltage. For example, with a cone having a base of 48 inches and a height of 30 inches, a 30 inch propeller rotating at 625 r.p.m. in relatively static ambient air was found to produce sufficient air flow to repel flies, gnats and mosquitoes. The applied voltage is controlled by a suitable voltage control 35 which may, for example, be any of the well known solid state feed back type speed controls, or with certain motors, a Variac voltage control may be applied. Thus, as ambient winds increase or decrease or as different kinds of insects are encountered speed control 35 can be regulated to maintain effective repelling of the insects.

In the embodiment shown and described, all of the shading is of course furnished by the cone 15. Additional shading can of course be provided by placing the insect repeller apparatus under a larger shelter such as a tent provided the air flow in and around the cone is not obstructed. For example, a tent approximating the height of the cone can be employed and a central opening can be left in the tent immediately above the cone so as to provide means for air to be drawn down and around the cone.

It may also be noted that a specific advantage of the structure of the present application is that the added outer cone 38, not shown in the parent application Serial 385,645, by being specially positioned, i.e. spaced away from cone 15, establishes space for forming a controlled annular "sheet" of turbulent air around the upper part of inner cone 15. Cone 38 is also particularly effective when the device is employed during a relatively strong wind. On such occasions cone 38 diverts the wind from the upper part of cone 15 and allows the air to gain velocity and form into its insect repelling sheet effect before such air is exposed to whatever wind conditions prevail at the time. Other advantages of the present structure reside in the portability, stability and adaptability of the supporting frame to straddle picnic tables and the like both longitudinally and laterally.

It is understood that the present disclosure has been made only by way of example and that numerous changes in the details of construction and the combination and arrangement of parts may be resorted to without departing from the spirit and scope of the invention hereinafter claimed.

What is claimed is:

1. A mobile shade and insect repelling apparatus for a picnic table or the like comprising a cart, said cart having a pair of spaced axles, ground engaging wheels rotatably mounted on each extremity of said axles, frame members joining said axles in a fixed relationship, and a U-shaped plate invertedly mounted on said frame members, said U-shaped plate adapted to slide across the top of and reside on said table; a vertically mounted post means rigidly secured to the upwardly extending portion of said inverted U-shaped plate; first and second cone shaped, air deflecting members securely mounted on and being in axial alignment with said post means, said second cone member being spacially positioned above and concentric with said first cone member; a propeller rotatably mounted above said first cone member about a common axis; and means mounted on said post means and connected to said propeller for driving the same at a relatively high revolving speed whereby air is forced downwardly between the outer surface of said first deflecting member and the inner surface of said second deflecting member thereby establishing a wall of downwardly and rapidly moving air surrounding said area being effective to repel insects attempting to enter the same.

2. The mobile shade and insect repelling apparatus of claim 1 wherein said electric motor includes a means for varying said revolving speed.

3. A mobile shade and insect repelling apparatus for picnic tables comprising a cart, said cart including a pair of spaced axles, a plurality of ground engaging wheels rotatably mounted on the extremities of said axles, a plurality of frame members joining said axles in a fixed relationship and forming a handle for pulling said cart, a plurality of vertically mounted support legs selectively positioned at the lower ends on said frame members, and a wall plate rigidly secured to the upper ends of said support legs, said wall plate adapted to slide across the top of and reside on said table; a vertically disposed post rigidly mounted on said wall plate; first and second cone shaped air deflecting members securely connected to said post by means of brackets and being in axial alignment with said post, said second cone member being spacially positioned above and extending over a major portion of the outer surface of said first cone member; an electric motor mounted on said post and having a drive shaft extending upwardly therefrom in axial alignment with said post; and a propeller mounted on said drive shaft above said first cone member and being adapted to be rotated at a given velocity by said electric motor whereby air is forced downwardly between the outer surface of said first cone member and the inner surface of said second cone member thereby establishing a buffered air zone around said table being impervious to insects.

4. The mobile shade and insect repelling apparatus of claim 3 wherein said electric motor includes a means for varying said velocity.

5. An apparatus for providing shade and repelling insects for a picnic table or the like of predetermined width comprising post means rigidly positioned and vertically disposed above said table and centrally of said width; first and second thin walled laterally spaced cone shaped air deflecting members concentrically and securely mounted on and being in axial alignment with said post means, said first and second cone members having respective major base diameters substantially equal to said predetermined width and said second cone member being spacially positioned above and extending over a major portion of the outer surface of said first cone member; a propeller mounted above said cone members for rotation about the axis thereof; motor means including a shaft coaxially mounted on said post means and connected to said propeller for driving the same at a relatively high speed whereby a wall of rapidly moving air is discharged outwardly and downwardly, the outer surface of said first cone and the inner surface of said second cone being arranged and serving to confine and direct the flow of said rapidly moving air such that the table area of said width immediately below said cones is substantially free of said rapidly moving air while the same table area of said width is substantially surrounded by said wall of said rapidly moving air thereby being effective to repel insects therefrom while preserving said table area for the usual picnic purposes.

6. The shading and insect repelling apparatus of claim 5 wherein said motor means comprises an electric motor and including means for varying the velocity of said propeller.

References Cited by the Examiner

UNITED STATES PATENTS

| | | | |
|---|---|---|---|
| 1,671,404 | 5/1928 | Cherry | 230—259 |
| 2,258,731 | 10/1941 | Blumenthal | 230—249.5 |
| 2,627,217 | 2/1953 | Hainke | 98—1 |
| 2,790,510 | 4/1957 | Brabec | 230—249.5 |
| 2,817,281 | 12/1957 | Schwan | 98—1 |
| 3,126,810 | 3/1964 | Karlsson | 98—36 |
| 3,228,317 | 1/1966 | Westman | 98—1 |

LAURENCE V. EFNER, *Primary Examiner.*